(12) United States Patent
Sonnier et al.

(10) Patent No.: US 7,802,245 B2
(45) Date of Patent: Sep. 21, 2010

(54) METHODS AND APPARATUS FOR PERFORMING IN-SERVICE UPGRADE OF SOFTWARE IN NETWORK PROCESSOR

(75) Inventors: David P. Sonnier, Austin, TX (US); Narender Reddy Vangati, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 1154 days.

(21) Appl. No.: 11/412,915

(22) Filed: Apr. 27, 2006

(65) Prior Publication Data

US 2007/0255764 A1 Nov. 1, 2007

(51) Int. Cl.
G06F 9/44 (2006.01)

(52) U.S. Cl. .................. 717/171; 717/168; 717/170
(58) Field of Classification Search .......... 717/168–178
See application file for complete search history.

(56) References Cited

U.S. PATENT DOCUMENTS

| 6,738,826 | B1 | 5/2004 | Moberg et al. | |
|---|---|---|---|---|
| 7,587,433 | B2 * | 9/2009 | Peleg et al. | 1/1 |
| 2004/0015952 | A1 | 1/2004 | Lajoie et al. | |

FOREIGN PATENT DOCUMENTS

| GB | 2370894 | 7/2002 |
|---|---|---|
| GB | 0624661.5 | 3/2007 |
| WO | WO0072528 | 11/2000 |
| WO | WO03021465 | 3/2003 |

* cited by examiner

*Primary Examiner*—Lewis A Bullock, Jr.
*Assistant Examiner*—Mark A Gooray
(74) *Attorney, Agent, or Firm*—Ryan, Mason & Lewis, LLP

(57) ABSTRACT

Improved techniques are disclosed for performing an in-service upgrade of software associated with a network or packet processor. By way of example, a method of performing an in-service upgrade of code, storable in a memory associated with a packet processor and executable on the packet processor, from a first code version to a second code version, includes the following steps. A first step includes preparing for the upgrade by generating one or more write operations to effectuate the code upgrade from the first code version to the second code version. A second step includes updating the code from the first code version to the second code version by propagating the one or more write operations to the packet processor. A third step includes cleaning up after the updating step by reclaiming one or more memory locations available after the update step. As such, the storage of only a single version of the code in the memory associated with the packet processor is required.

20 Claims, 3 Drawing Sheets

METHODS AND APPARATUS FOR PERFORMING IN-SERVICE UPGRADE OF SOFTWARE IN NETWORK PROCESSOR

FIELD OF THE INVENTION

The present invention relates generally to packet processing systems, and more particularly to a network processor or other type of processor configured for use in performing packet processing operations within such a system.

BACKGROUND OF THE INVENTION

A network or packet processor generally controls the flow of packets between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards.

Such network processors may be designed into carrier class products which have to support extremely high reliability and availability. These environments have long product life cycles and mandate very small down times, i.e., times when a network processor is not available for use. In such an environment, it is desirable for a network processor to be capable of an in-service upgrade, where the software code executed by the network processor can be updated on a running system with minimal, if any, down time.

An existing approach for in-service upgrade is to partition the memory of the network processor, which stores the software code to be executed by the network processor, into two segments. The first memory segment contains the current software code, while the updated software code is loaded into the second memory segment. At the appropriate time, a switch over is performed, making the updated software code active.

However, this approach results in a significant waste of memory. That is, since two copies of the software code are maintained, i.e., current and updated versions, only half of the memory associated with the network processor is usable.

Accordingly, a need exists for improved techniques for performing an in-service upgrade of software associated with a network processor.

SUMMARY OF THE INVENTION

Principles of the invention provide improved techniques for performing an in-service upgrade of software associated with a network or packet processor.

By way of example, in one aspect of the invention, a method of performing an in-service upgrade of code, storable in a memory associated with a packet processor and executable on the packet processor, from a first code version to a second code version, includes the following steps. A first step includes preparing for the upgrade by generating one or more write operations to effectuate the code upgrade from the first code version to the second code version. A second step includes updating the code from the first code version to the second code version by propagating the one or more write operations to the packet processor. A third step includes cleaning up after the updating step by reclaiming one or more memory locations available after the update step. As such, the storage of only a single version of the code in the memory associated with the packet processor is required.

The code being upgraded may include one or more processing elements and the updating step may include, for each processing element, ceasing operation of at least a portion of the packet processor responsible for executing the processing element. The updating step may further include, for each processing element, propagating to the packet processor the one or more write operations associated with the processing element. Still further, the updating step may include, for each processing element, restarting operation of the ceased portion of the packet processor. The processing element may include a functionally discrete block of code, by way of example only, one or more programs associated with packet classification. Also, it is to be understood that the first code version may include an old code version and the second code version may include a new code version.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be illustrated below in conjunction with an exemplary packet classification function performed by software executable on a network processor that is part of a packet processing system. It should be understood, however, that the invention is more generally applicable to any network processor function or software in a packet processing system in which it is desirable to avoid the drawbacks attributable to the use of existing techniques for performing in-service upgrades to software associated with the network processor.

By way of example only, principles of the invention are applicable to packet processors such as those available from Agere Systems Inc. (Allentown, Pa.), e.g., network processors respectively identified as APP350, APP550, and APP650. However, it is to be understood that principles of the invention are not limited to these, or any, particular processors.

It is to be understood that the term "processor" as used herein may be implemented, by way of example and without limitation, utilizing a microprocessor, central processing unit (CPU), digital signal processor (DSP), application-specific integrated circuit (ASIC), or other type of data processing device or processing circuitry, as well as portions and combinations of these and other devices or circuitry.

It is also to be understood that the term "software," as used herein, generally refers to one or more instructions that may be executed (run) by a processor in order to perform one or more functions. The term "software" is also interchangeably used herein with terms/phrases such as "software code," "code," "software program(s)," or "program(s)." However, it is to be appreciated that the invention is not limited to any particular definition of software and, thus, the in-service upgrade principles of the invention are applicable to these and other definitions.

Figure 1:
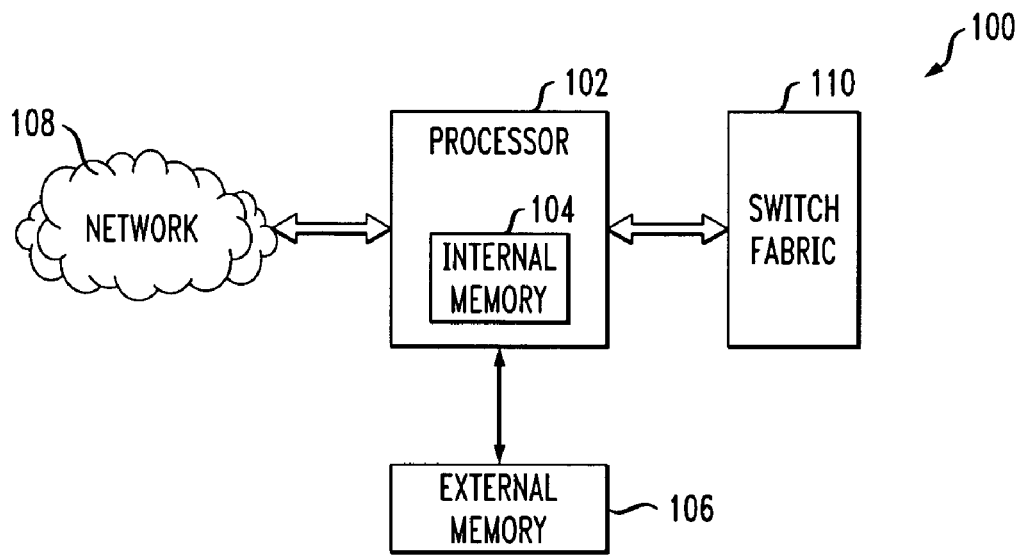
FIG. 1 is a block diagram illustrating a packet processing system in which embodiments of the invention may be implemented.

Referring to FIG. 1, an illustrative packet processing system 100 is shown in which embodiments of the invention are implemented. The system 100 includes a network processor 102 having an internal memory 104. The network processor 102 is coupled to an external memory 106 as shown, and is configured to provide an interface between a network 108 from which packets are received and a switch fabric 110 which controls switching of packet data. The processor 102 and its associated external memory 106 may be implemented, e.g., as one or more integrated circuits installed on a line card of a router or switch. In such a configuration, the switch fabric 110 is generally considered to be a part of the router or switch.

Although the memory 106 is shown in the figure as being external to the processor 102, the term "processor" as used herein, as indicated previously, is intended to be sufficiently broad to encompass elements 102 and 106.

It should be understood that the particular arrangement of system elements shown in FIG. 1 is by way of illustrative example only. For example, as previously noted, principles of the invention can be implemented in any type of packet processor, and is not limited to any particular packet processing application.

In performing packet processing operations such as classifying, routing or switching, the network processor typically must examine at least a portion of each packet. A packet is generally made up of a string of binary bits. The amount of each packet that must be examined is dependent upon its associated network communication protocols, enabled options, and other similar factors.

More specifically, in a packet processing operation, the network processor typically utilizes a tree search process to determine various characteristics associated with each packet, i.e., to classify the input data according to one or more data attributes. This is referred to as a classification function or process. As is known, the tree structure (which can be in the form of a data structure such as one or more look-up tables) typically has a root portion where the search begins, intermediate branches, and finally a plurality of leaves, where the final decisions or matches occur. Thus, each node of the tree is an entry or a decision point, and such entries or decision points are interconnected by branches. An instruction or bit pattern resides at each decision point for analyzing the input bit pattern (also referred to as the search object) and in response thereto for sending the bit pattern to the next appropriate decision point.

Since the data is presented in the form of binary bits, the classification process compares groups of the input bits with known bit patterns, represented by entries in the tree structure. A match between the group of input bits and the bits at a tree entry directs the process to the next sequential entry in the tree. The matching processes progress through each entry of the tree until the end is reached, at which point the input bits have been characterized or classified. Because a large number of bits must be classified in a data network, these trees can require many megabits of memory storage capacity.

The classification process finds many uses in a data communications network. The input data packets can be classified based on a priority indicator within the packet, using a tree structure where the decision paths represent the different network priority levels. Once the priority level is determined for each packet, based on a match between the input bits and the tree bits representing the available network priority levels, then the packets can be processed in priority order. As a result, the time sensitive packets (e.g., those carrying video-conference data) are processed before the time insensitive packets (e.g., a file transfer protocol (FTP) data transfer). Other packet classifications processes determine the source of the packet (for instance, so that a firewall can block all data from one or more sources), examine the packet protocol to determine which web server can best service the data, or determine network customer billing information. Information required for the reassembly of packets that have been broken up into data blocks for processing through a network processor can also be determined by a classification process that examines certain fields in the data blocks. Packets can also be classified according to their destination address so that packets can be grouped together according to the next device they will encounter as they traverse the communications medium.

As is known, tree structures and related instructions that direct the classification process (collectively referred to herein as "classification software"), as illustratively explained above, are typically stored on the internal memory of a network processor (e.g., memory 104 of network processor 102 in FIG. 1), loaded, and executed when needed. Different parts of the classification software can be stored on different parts of the internal memory. However, since high reliability and availability are required of a carrier class network processor, upgrade of such classification software should preferably be accomplished on the network processor, as it is running software code (i.e., in-service), with very little (if any) down time.

By way of example, there are two reasons to perform an in-service update of classification software: (1) one or more programs that constitute the software contain a minor error (bug) and need to be fixed; and (2) a new protocol needs to be supported by the software.

It is realized that such in-service software upgrade presents quite a few challenges, some of which are described below.

At the highest level, the classification software is made up of two types of functions: (1) flows; and (2) trees. Flows define the control flow of the program and trees define tables which may or may not be updated at runtime. It is to be noted that such partitioning of function (flows and trees) is consistent with the general description above of classification software and its associated trees.

Trees are stored in a tree memory section of the memory of network processor, which can be organized into multiple levels of performance (e.g., micro root, root, and external if memory external to the network processor is employed for storing part of a tree structure). Flows are stored in a flow memory section of the memory of the network processor. In one embodiment, the entire flow code is kept in tree memory and sets of flow functions (modules) are moved in and out of flow memory at runtime.

There are many challenges in updating a running program with minimal impact on the packet traffic, both from the end user side in terms of compatibility, as well as implementation logistics in an associated compiler and an associated application programming interface (API).

In many ways, the new (changed) program has to be compatible with the old program. For example, in a network processor that employs a store-and-forward model for processing packets, there may be packets which have been enqueued by the old program's first pass logic. When the switch over from the old software to the new software happens, these packets will be processed by the new program's second pass logic, and this compatibility has to be maintained. However, depending on the function of the software, there may be many other compatibilities that need to be maintained. Typically, maintaining these compatibilities is an end user/application responsibility.

Typically, functions associated with the software may have unique names and may be mapped to unique numbers. The numbers serve as the function identifier in the API for runtime operations. The compiler automatically assigns these numbers for functions which are not already mapped by the user. When a program has been changed and recompiled, the number assignments may change and this might invalidate a previous control flow. Generally, function names are not expected to change since there would be no means for mapping functions from the old program to the new program.

Since the classification software of a network processor is user editable, this can present many challenges in determining what has changed for update purposes. The issues are different for flows and trees.

As mentioned above, flow functions define the control flow of the program and any change can have program wide impact. As an example, where the compiler assigns global register names to physical registers by analyzing the program, any slight change can affect the control flow significantly and change register assignments throughout the program.

Trees can be dynamic in nature and can be used to build large tables of patterns. When such trees have references to other classification functions, this can result in a large number of nodes which need to be updated when the referenced function's address changes in the new code.

There are other trees which are more utilitarian in nature and are used to map known patterns to actions. These are more to define the control flow such as flow functions and any changes here can have an effect on the program.

From a language syntax perspective, classification software is free flowing and the user can define arbitrary sequences of statements which the compiler may break up into implicit flows and trees to fit the architecture. Slight changes in the program can generate different implicit flows and trees and these need to be handled appropriately.

In an ideal situation, the new program would be installed on the running system with no effect on traffic. However, given the nature of the problem and the memory restrictions, this may be impossible to achieve and a small amount of window is permissible where the traffic may be dropped or processed at a lower rate. Typically, this window is measured in single digits of milliseconds. Thus, given the nature of the network processor architecture, it is evident that the new code has to be downloaded to the hardware in a small time window.

When an upgrade involves adding new code (especially trees), there may be issues in building these trees depending on the state of the system. If the memory on the running system is very fragmented, it may not be possible to find enough contiguous space to build some of the new trees.

Given such challenges illustrated above, we now describe an illustrative embodiment for an in-service upgrade of classification software associated with a network processor, which addresses and overcomes the above-mentioned and other drawbacks and challenges.

It is realized that the nature of an upgrade of classification software involves a significant number of memory write operations (or more simply referred to as "writes") to install the new code. This includes properly rebuilding the flow code in its entirety, and properly updating large trees with potentially hundreds of thousands of references. Given the time restrictions where the maximum down time is measured in milliseconds, principles of the invention realize that this necessitates a staged or phased approach where some kind of preparation and cleanup are done outside the down time and a small but predictable set of writes are done for the atomic switch over.

Figure 2:
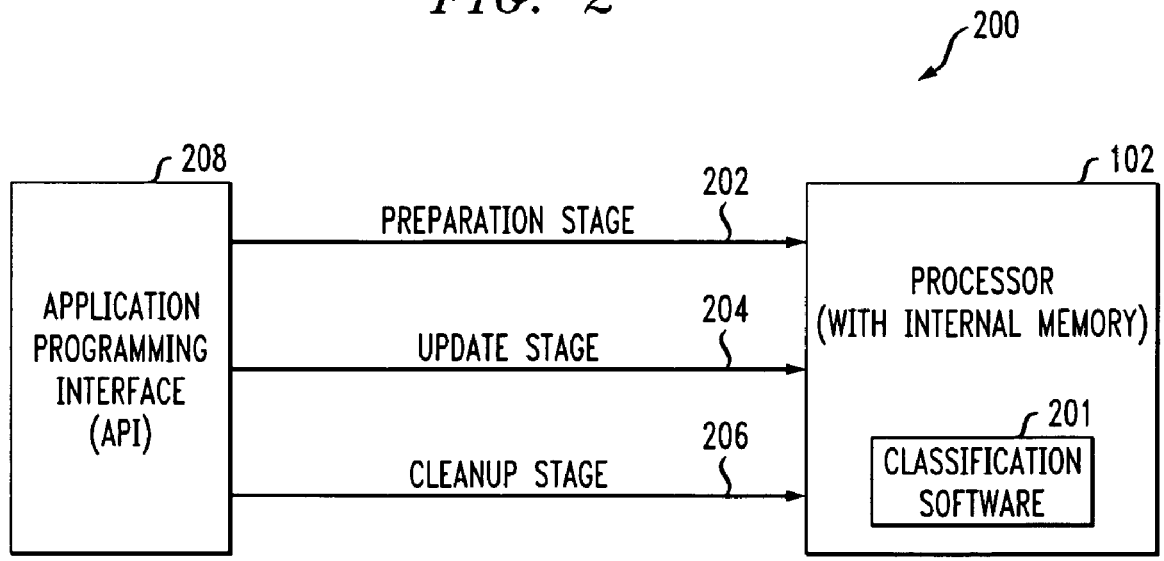
FIG. 2 is a block diagram illustrating a staged methodology for in-service upgrade of software associated with a network processor according to an embodiment of the invention.

FIG. 2 illustrates a staged (or phased) approach to an in-service upgrade of software associated with a network processor according to an embodiment of the invention. As shown, in-service upgrade 200 of classification software 201 is performed by an end user (not shown), via API 208, in a three stage approach comprising preparation stage 202, update stage 204, and cleanup stage 206.

In general, preparation stage 202 involves preparing for the upgrade. Various memory writes can be done in this phase, but the hardware is still executing the old code. Preparation can also involve getting ready for the update such as building instructions and buffering memory writes, such that they are ready to be propagated to the hardware (network processor 102) during the update.

In general, in update stage 204, a limited set of writes are performed to switch the hardware to the new code. This stage involves stalling/un-stalling the processor around the switch over. As such, the overriding goal for this stage is to generate as few block writes as possible to the memory sections of the processor affected by the upgrade. After this stage, the hardware is executing new code.

In general, cleanup stage 206 involves any cleanup to be done. This may involve freeing and reclaiming memory, moving trees around and so on.

By way of example, in the context performing an update on a network processor, the update starts at the processing point functionally closest to output side of the integrated circuit. Processing through the processor is suspended (either discarding data, or queuing it up in front of that point). Once the processor is at a quiescent point, then the code for that processor is updated. Then, traffic through that part of the integrated circuit is restarted.

Furthermore, this process may be performed for each functional block of code (i.e., processing element), moving functional block by functional block towards the input side of the integrated circuit. One example of a functional block is the classification program described herein. However, it is to be understood that the classification program itself can be broken into blocks (with associated trees and flows, as will be described below) and processed in the manner described herein.

Thus, update stage 204 would include, for each processing element (e.g., block) associated with the code being upgraded, ceasing (i.e., stalling or stopping) operation of at least a portion of the network processor responsible for executing the processing element, propagating to the network processor the one or more write operations associated with the processing element, and then restarting operation of the ceased portion of the network processor.

Advantageously, the software associated with the processor may be upgraded one processing element at a time. By keeping the actual updating step relatively short (for each processing element), the effect on network traffic is minimized. Therefore, by performing the actual updating step one processing element at a time and efficiently quiescing/restarting each element, significant processor outage is avoided.

Given such an in-service upgrade methodology, various issues and their solutions are described below, mapping them to this sequence, where applicable.

A. Flows

As described above, a slight change in any of the control flow paths defined by flow functions can have a program wide impact. In addition, flow functions have very strict requirements in memory layout. Rather than determining individual changes and trying to retrofit them into the existing flow code which may be impossible, the flow code is replaced in its entirety by the new code.

In accordance with an illustrative embodiment of a network processor, an application running on the network processor manages the flow memory at runtime by partitioning the services of the application into software modules and individually loading or unloading such modules from flow memory. Flow memory can be a section of the internal memory (104 of FIG. 1) of the network processor.

For example, on an initial load, modules are loaded into flow memory based on a preloading priority. At runtime, the application may perform various loading/unloading operations and a subset of the defined modules is loaded into flow memory, at any given time. For such an application, currently loaded modules (loaded before the upgrade) should still be loaded into flow memory after the upgrade. Given the above, the following approach is followed to determine the state of flow memory after the upgrade. Any previously loaded modules from the old code are loaded from the new code. The remaining modules are loaded based on the preloading priority. That is, the upgrade process makes certain that the modules from the old code which were loaded into flow memory are still loaded after the upgrade and any new modules would be loaded thereafter.

Figure 3:
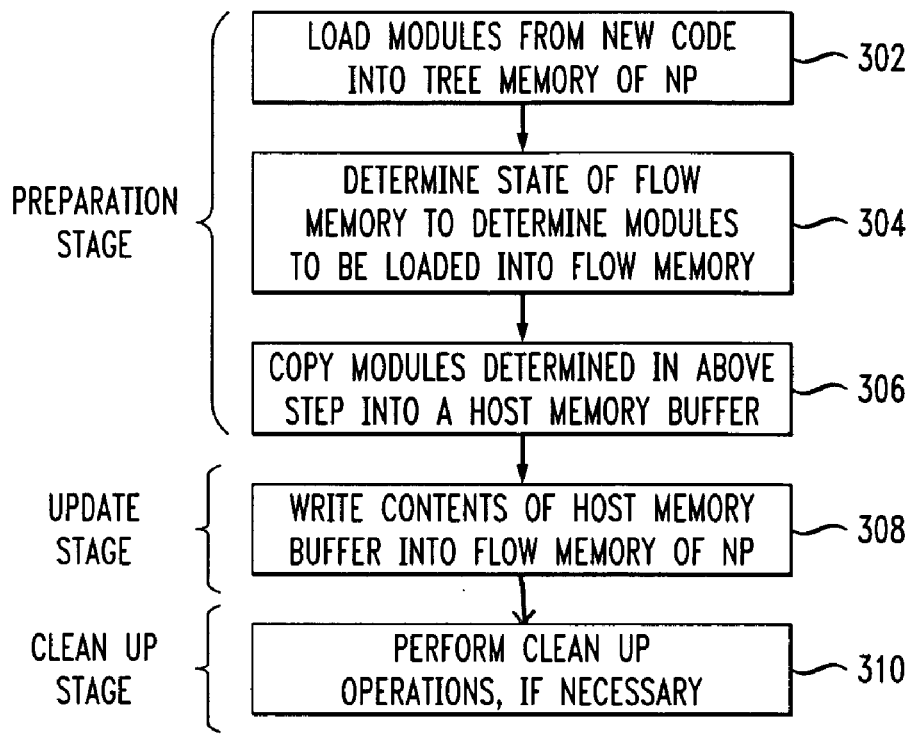
FIG. 3 is a flow diagram illustrating a staged methodology for in-service upgrade of flow code associated with a network processor according to an embodiment of the invention.

Given the above features of an illustrative network processor, the FIG. 2 stages used to upgrade the flow code during an in-service upgrade are as follows. The flow code upgrade process is illustrated in the context of FIG. 3. Again, it is to be understood that the reference to "memory" of the network processor (e.g., tree memory, flow memory, etc.) in these embodiments may refer to internal memory 104, external memory 106, or a combination of internal memory 104 and external memory 106.

As shown in FIG. 3, during the preparation stage (202 of FIG. 2), the modules from the new code are loaded into tree memory of the network processor (NP), overwriting the flow code tree memory copy from the old code (step 302). Then, the current state of flow memory of the NP is examined to determine the modules to be loaded (step 304). These modules and others, determined by module preloading priority, are copied into a host memory buffer mimicking the flow memory and all function references adjusted (step 306). It is to be understood that the "host memory buffer" resides on a host computer system (not shown) with which the end user interfaces with the network processor via API 208 (FIG. 2). The size of this buffer is, preferably, at least equivalent to the amount of flow memory on NP.

During the update stage (204 of FIG. 2), the host memory buffer is written to the NP, changing the contents of the flow memory (step 308).

During the cleanup stage (206 of FIG. 2), any necessary cleanup operations are performed (step 310). One such operation would be to free the allocated host memory buffer.

It is to be appreciated that, in certain network processor architectures, a number of flow functions use tree instructions to perform operations such as inline pattern matches, extracts, etc. These tree instructions may be loaded into root (or micro root) memory, where possible. In the new code, the same memory allocation needs to be done, as well, to preserve the performance. However, depending on the state of the system, this faster memory may not be available, though the old code's tree instructions will be freed once the old code is replaced.

While building the tree memory copy of the new code, the old code's tree addresses will be reused (as though they were free) without changing their contents. These addresses with their new data will be queued up and, in the update phase, will be downloaded to the hardware.

While allocating these addresses for the old code, a certain buffer may need to be pre-allocated to allow for additions in the new code to keep the addressees as contiguous as possible.

B. Trees

Tree data structures present a different set of challenges than flow data structures. Principles of the invention define two types of tree classification: (1) Static trees; and (2) Non-static trees. As will be explained, each classification is handled differently in the in-service upgrade. It is understood that the end user can make the determination of whether a tree is static or non-static (based on the illustrative definitions below). However, automated and semi-automated determination processes may be employed.

1. Static Trees

A "static tree" is defined as a tree that does not change at runtime, i.e., during execution of the network processor software. Static trees are completely specified in the software being updated and thus are not managed (and changed) at runtime. An example of such a tree is one that defines a protocol mapping, e.g., wherein a protocol type field is mapped to a protocol specific function. Since these trees are integral to the control flow of the program, they are completely rebuilt during the upgrade.

Given the above features of a static tree, the FIG. 2 stages used to upgrade the static tree code during an in-service upgrade are as follows. The static tree code upgrade process is illustrated in the context of FIG. 4

Figure 4:
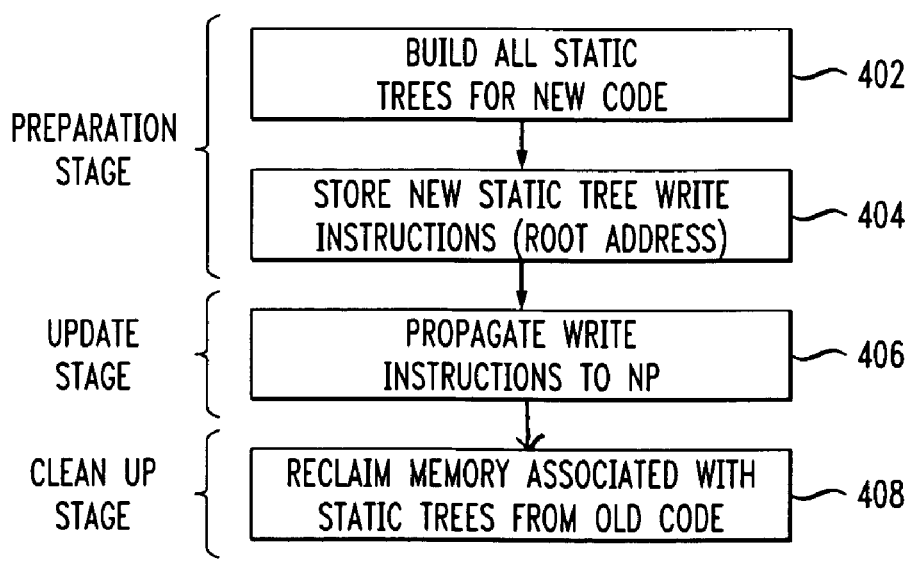
FIG. 4 is a flow diagram illustrating a staged methodology for in-service upgrade of static tree code associated with a network processor according to an embodiment of the invention.

As shown in FIG. 4, during the preparation stage (202 of FIG. 2), all static trees for the new code are built (step 402). This includes rebuilding trees that change from the old code to the new code, as well as building new tress that may not be in the old code but are required in the new code. Since memory can be very fragmented and contiguous memory for an 8, 12 or 16-bit table cannot be guaranteed, static trees are first built with a 4-bit table. This guarantees that as long as there are 16 contiguous free locations and enough free memory, the tree can be built and all patterns learned.

Here, though the main tree structure (with the initial table and subsequent instructions) is built in free memory (i.e., unused portion of NP free memory), the root address from the previous incarnation (old tree) is reused. The root address is the memory address that points to the root of the tree. This root address is written to point to the new tree (table), but the write is not propagated to the hardware (NP). These writes are queued up (stored) until the update phase (step 404).

During the update stage (204 of FIG. 2), the root address writes (stored in step 404) are propagated to the NP (step 406). If tree root addresses were allocated together, this again, can be turned into a single block write.

During the cleanup stage (206 of FIG. 2), i.e., once the new code is installed and running, the previous tables and sub-trees for all static trees from the old code are deleted and the memory reclaimed, except root addresses (step 408). Once this memory is reclaimed, the static trees from the new code is rebuilt in this free space based on the normal priority order. In order to do this, the rules for all the static trees may need to be preserved and re-learned to the new table.

It is to be understood that the use of the "static tree" concept has benefits in network processor operations other than in-service upgrades. For example, a static tree (which, by definition, can not be changed at runtime) lends itself to better analysis and optimal layout in memory to achieve the best performance and the least memory usage.

2. Non-Static Trees

All trees which are not defined as "static" are considered "non-static" or dynamic, i.e., they change or are managed (by the application) at runtime. Thus, non-static trees are not rebuilt on an upgrade. Examples of such trees include routing tables and access control lists. The only change done to these trees is to update any function references (jumping to another function) to the new code. These function references are for flow functions. Since tree root addresses do not change, tree-to-tree references do not need to be updated.

Figure 5:
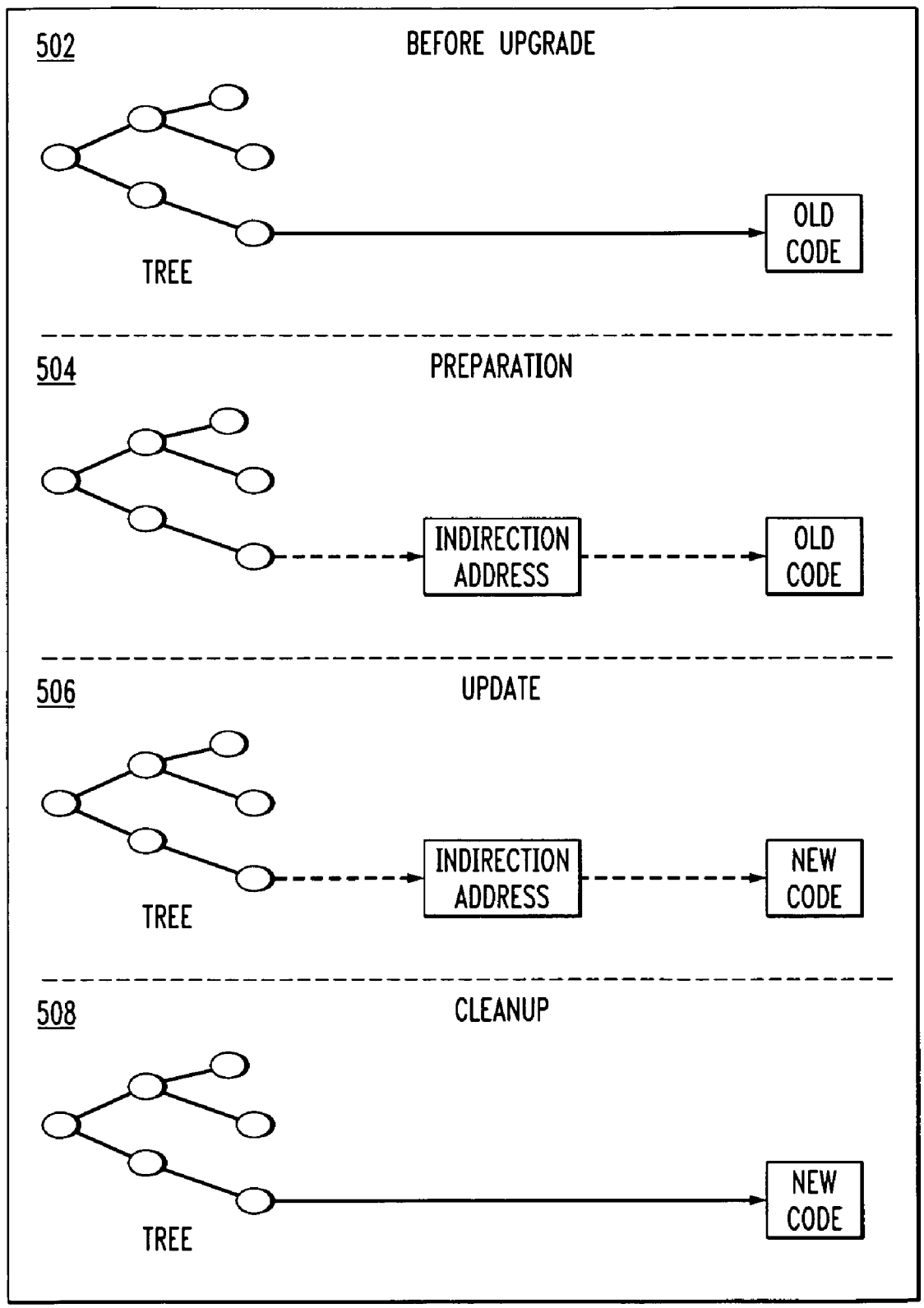
FIG. 5 is a flow diagram illustrating a staged methodology for in-service upgrade of non-static tree code associated with a network processor according to an embodiment of the invention.

However, these non-static trees can be very large (routing tables), and a single function reference may be replicated in thousands of nodes. It is not feasible to traverse and update these references in a time-restricted manner. Instead, the following approach is used, as illustrated in FIG. 5.

For every flow function which is referenced by a non-static tree, an indirection address is allocated in tree memory. Normally, this indirection address is simply redirected to the flow address from the old code (step 502). In the preparation stage (202 of FIG. 2), preferably towards the end, all non-static trees are traversed and any flow function reference is modified to point to the flow's indirection address (step 504). At this point, all the trees are still referencing the old code with an additional instruction penalty. Now, these indirection instructions are updated to point to the new address for the flow (from the new code), but the write is queued up (stored) and not propagated to the hardware.

During the update stage (204 of FIG. 2), these queued up writes are written to the NP (step 506). If these addresses are contiguous, this process can be done with a single block write.

Once the update stage is finished, the hardware is running all new code and the trees are referencing the new addresses with an additional instruction penalty. At this point, in the cleanup stage (206 of FIG. 2), the trees are traversed again and the reference to the indirection address is replaced with the real function address (step 508).

It is to be understood that any new static trees (i.e., static trees that do not exist at all in the version of the code to be updated) are handled by the general mechanism for static trees. Any new non-static trees will be built during the preparation stage according to the normal priority order. It is possible that if memory is very fragmented, it may not be possible to allocate the root table structures for these trees. The API may employ a back-off scheme trying smaller table sizes. If even a 4-bit table cannot be allocated, it will be treated as an error for the upgrade process. The user may define some dummy trees in the initial classification program to accommodate changing needs. Any trees which are deleted from the new code will be freed and the memory reclaimed.

As is evident, the amount of downtime associated with the staged in-service upgrade approach of the invention is related to the number of write operations performed during the update stage. During the update stage, the root address for each tree and the indirection table for the function references is written to memory. Given a maximum of 1K trees and 1K flows, there are at most 2k addresses to update. However, the number of updates may be far less. These addresses can be allocated in sequence as a single block, and the entire block can be written to the network processor as a single direct memory access (DMA) transfer. That is, all writes necessary to upgrade the flow code, static tree code and non-static tree code can preferably be performed as a single DMA transfer.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of performing an in-service upgrade of code, storable in a memory associated with a packet processor and executable on the packet processor, from a first code version to a second code version, comprising the steps of:

preparing for the upgrade by generating one or more write operations to effectuate the code upgrade from the first code version to the second code version, the preparing step comprising the steps of:

allocating an indirection address for a given flow function, wherein the indirection address points to an address for the given flow function in the first code version;

modifying one or more references to the given flow function to point to the indirection address for the given flow function;

generating the one or more write operations, wherein the one or more operations are operative to update the indirection address for the given flow function to point to an address for the given flow function in the second code version;

updating the code from the first code version to the second code version by propagating the one or more write operations to the packet processor; and cleaning up after the updating step, the cleaning up step comprising the steps of:

modifying the one or more references to the given flow function to point to the address for the given flow function in the second code version; and reclaiming one or more memory locations available after the update step;

wherein the preparing, updating and cleaning up steps require only the storage of a single version of the code in the memory associated with the packet processor.

2. The method of claim 1, wherein the code being upgraded comprises one or more processing elements and the updating step further comprises, for each processing element, ceasing operation of at least a portion of the packet processor responsible for executing the processing element.

3. The method of claim 2, wherein the updating step further comprises, for each processing element, propagating to the packet processor the one or more write operations associated with the processing element.

4. The method of claim 3, wherein the updating step further comprises, for each processing element, restarting operation of the ceased portion of the packet processor.

5. The method of claim 4, wherein the processing element comprises a functionally discrete block of code.

6. The method of claim 1, wherein the first code version comprises an old code version and the second code version comprises a new code version.

7. The method of claim 1, wherein the code executable on the packet processor comprises code for executing a packet classification function.

8. A packet processor configured to have code, storable in a memory associated with the packet processor and executable on the packet processor, upgraded from a first code version to a second code version by a process comprising the steps of:

preparing for the upgrade by generating one or more write operations to effectuate the code upgrade from the first code version to the second code version, the preparing step comprising the steps of:
  allocating an indirection address for a given flow function, wherein the indirection address points to an address for the given flow function in the first code version;
  modifying one or more references to the given flow function to point to the indirection address for the given flow function;
  generating the one or more write operations, wherein the one or more operations are operative to update the indirection address for the given flow function to point to an address for the given flow function in the second code version;
updating the code from the first code version to the second code version by propagating the one or more write operations to the packet processor; and
cleaning up after the updating step, the cleaning up step comprising the steps of:
  modifying the one or more references to the given flow function to point to the address for the given flow function in the second code version; and
  reclaiming one or more memory locations available after the update step;
wherein the preparing, updating and cleaning up steps require only the storage of a single version of the code in the memory associated with the packet processor.

9. The packet processor of claim 8, wherein the code being upgraded comprises one or more processing elements and the updating step further comprises, for each processing element, ceasing operation of at least a portion of the packet processor responsible for executing the processing element.

10. The packet processor of claim 9, wherein the updating step further comprises, for each processing element, propagating to the packet processor the one or more write operations associated with the processing element.

11. The packet processor of claim 10, wherein the updating step further comprises, for each processing element, restarting operation of the ceased portion of the packet processor.

12. The packet processor of claim 11, wherein the processing element comprises a functionally discrete block of code.

13. The packet processor of claim 8, wherein the first code version comprises an old code version and the second code version comprises a new code version.

14. The packet processor of claim 8, wherein the code executable on the packet processor comprises code for executing a packet classification function.

15. The packet processor of claim 8, wherein the packet processor is implemented on an integrated circuit.

16. The method of claim 1, wherein the preparing step further comprises the step of building at least one tree associated with the second code version.

17. The method of claim 16, wherein the one or more write operations are further operative to modify a root address to point to the at least one tree associated with the second code version instead of at least one tree associated with the first code version.

18. The method of claim 17, wherein the one or more memory locations comprises one or more memory locations associated with the at least one tree associated with the first code version.

19. The packet processor of claim 8, wherein the preparing step further comprises the step of building at least one tree associated with the second code version.

20. The packet processor of claim 19, wherein the one or more write operations are further operative to modify a root address to point to the at least one tree associated with the second code version instead of at least one tree associated with the first code version.

* * * * *